United States Patent
Walters et al.

(10) Patent No.: US 9,998,027 B2
(45) Date of Patent: Jun. 12, 2018

(54) DUAL MODE POWER SUPPLY CONTROLLER WITH CHARGE BALANCE MULTIPLIERS AND CHARGE BALANCE MULTIPLIER CIRCUITS

(71) Applicant: Cree, Inc., Durham, NC (US)

(72) Inventors: Michael Walters, Apex, NC (US); Qingcong Hu, Morrisville, NC (US)

(73) Assignee: CREE, INC., Durham, NC (US)

( * ) Notice: Subject to any disclaimer, the term of this patent is extended or adjusted under 35 U.S.C. 154(b) by 0 days. days.

(21) Appl. No.: 15/359,737

(22) Filed: Nov. 23, 2016

(65) Prior Publication Data

US 2017/0077833 A1    Mar. 16, 2017

Related U.S. Application Data

(60) Division of application No. 13/734,327, filed on Jan. 4, 2013, now Pat. No. 9,509,215, which is a continuation-in-part of application No. 13/664,979, filed on Oct. 31, 2012, now Pat. No. 9,484,805.

(51) Int. Cl.

| | |
|---|---|
| G05F 3/16 | (2006.01) |
| H02M 7/217 | (2006.01) |
| H02M 3/156 | (2006.01) |
| H05B 33/08 | (2006.01) |
| H02M 1/08 | (2006.01) |
| H02M 1/00 | (2006.01) |

(52) U.S. Cl.
CPC ............ *H02M 7/217* (2013.01); *H02M 1/08* (2013.01); *H02M 3/156* (2013.01); *H05B 33/0815* (2013.01); *H05B 33/0848* (2013.01); *H02M 2001/0009* (2013.01); *H02M 2001/0016* (2013.01)

(58) Field of Classification Search
CPC ........ H02M 3/156; H02M 7/217; H02M 1/08; H02M 2001/0016; H02M 2001/0009; H05B 33/0815; H05B 33/0848
USPC ................ 323/207, 222, 282, 283, 284, 285
See application file for complete search history.

(56) References Cited

U.S. PATENT DOCUMENTS

| | | |
|---|---|---|
| 4,518,901 A | 5/1985 | Fukushima et al. |
| 4,581,542 A | 4/1986 | Steigerwald |
| 5,015,836 A | 5/1991 | Van Antwerp |
| 5,446,366 A | 8/1995 | Bassett et al. |
| 6,049,234 A | 4/2000 | Miyashita et al. |
| 6,621,235 B2 | 9/2003 | Chang |
| 6,839,247 B1 * | 1/2005 | Yang ................... H02M 1/4225 363/21.07 |
| 7,102,339 B1 | 9/2006 | Ferguson |
| 7,906,943 B2 | 3/2011 | Isobe et al. |
| 7,944,721 B2 | 5/2011 | Yang |

(Continued)

OTHER PUBLICATIONS

International Search Report Corresponding to International Application No. PCT/US2012/065533; dated Feb. 5, 2013; 11 Pages.

(Continued)

*Primary Examiner* — Alex Torres-Rivera
(74) *Attorney, Agent, or Firm* — Sage Patent Group

(57) ABSTRACT

A circuit for generating an output current includes a control signal generating circuit that is configured to generate a control signal. The control signal is a function of a level of an analog input voltage signal, and a level of the output current is a function of a level of an analog input current signal and the level of the analog input voltage signal.

9 Claims, 15 Drawing Sheets

(56) References Cited

U.S. PATENT DOCUMENTS

| | | |
|---|---|---|
| 8,207,713 B2 | 6/2012 | Sugawara |
| 2001/0024374 A1 | 9/2001 | Ben-Yaakov |
| 2003/0181186 A1* | 9/2003 | Sorrells ............... H03C 3/40 455/296 |
| 2003/0222633 A1 | 12/2003 | Hwang |
| 2005/0052165 A1 | 3/2005 | Willner et al. |
| 2005/0146903 A1* | 7/2005 | Yang ............ H02M 3/33507 363/21.15 |
| 2005/0219870 A1* | 10/2005 | Yang ............ H02M 3/33507 363/21.01 |
| 2005/0264344 A1* | 12/2005 | Kim ............... H04W 52/028 327/538 |
| 2006/0125454 A1 | 6/2006 | Chen et al. |
| 2006/0186866 A1 | 8/2006 | Sharma |
| 2007/0103949 A1 | 5/2007 | Tsuruya |
| 2008/0067993 A1 | 3/2008 | Coleman |
| 2008/0272748 A1 | 11/2008 | Melanson |
| 2009/0001946 A1 | 1/2009 | Mehas et al. |
| 2010/0061125 A1* | 3/2010 | Ikezawa ............ H02M 3/33507 363/21.12 |
| 2010/0201336 A1 | 8/2010 | Chen et al. |
| 2011/0074292 A1 | 3/2011 | Maehara |
| 2011/0149614 A1 | 6/2011 | Stracquadaini |
| 2011/0279044 A1 | 11/2011 | Maiw |
| 2012/0038418 A1 | 2/2012 | Akyol et al. |
| 2012/0069611 A1 | 3/2012 | Yang et al. |
| 2012/6049825 | 3/2012 | Chen et al. |
| 2012/0154042 A1 | 6/2012 | Nadimpalli et al. |
| 2012/0274290 A1 | 11/2012 | Ye et al. |
| 2013/0294118 A1* | 11/2013 | So .................... H02M 3/33507 363/21.16 |

OTHER PUBLICATIONS

ST Microelectronics, L6561 Power Factor Corrector Datasheet, Jun. 2004, retrieved Mar. 2,2013 at URL: http://www.st.com/web/en/resource/technical/document/datasheet/CD00001174.pdf, 13 pages.

* cited by examiner

DUAL MODE POWER SUPPLY CONTROLLER WITH CHARGE BALANCE MULTIPLIERS AND CHARGE BALANCE MULTIPLIER CIRCUITS

RELATED APPLICATION

The present application is a divisional of U.S. patent application Ser. No. 13/734,327, filed Jan. 4, 2013, now U.S. Pat. No. 9,509,215, which is a continuation-in-part of U.S. patent application Ser. No. 13/664,979, filed on Oct. 31, 2012, now U.S. Pat. No. 9,484,805, the disclosures of which are hereby incorporated by reference herein as if set forth in its entirety.

TECHNICAL FIELD

The present disclosure relates to power converter circuits, and more particularly to power converter circuits that generate output power.

BACKGROUND

Power converters, or power supplies, may be used in electronic applications to convert an input voltage to a desired output voltage to power one or more electronic devices. Some power supplies may be classified as either a linear power supplies or a switched-mode power supply (SMPS).

Switched-mode power supplies may be configured to operate more efficiently than linear power supplies. A switched-mode power supply may include a switch that, when switching on and off, stores energy in an inductor and discharges the stored energy to an output of the switched mode power supply. The switch may be controlled by a controller, which outputs switching signals to turn the switch on and off.

SUMMARY

A circuit for generating an output current includes a control signal generating circuit that is configured to generate a control signal. The control signal is a function of a level of an analog input voltage signal, and a level of the output current is a function of a level of an analog input current signal and the level of the analog input voltage signal.

The circuit may further include a switched current source that is controlled by the control signal, and a balance capacitor coupled to the switched current source. A duty cycle of the control signal may be proportional to a level of the analog input voltage signal, and a level of the output current may be proportional to a product of a level of the analog input current signal and the level of the analog input voltage signal.

The circuit may further include an output current mirror coupled to the balance capacitor. The switched current source may receive the analog input current signal as an input, and the balance capacitor may be charged by a current output by the switched current source and discharged through the output current mirror.

The circuit may further include a resistor between the balance capacitor and the output current mirror.

The control signal generating circuit may include a comparator configured to receive the analog input voltage signal and a ramp voltage and to generate the control signal in response to the analog input voltage signal and the ramp voltage, and a ramp voltage generating circuit coupled to the comparator and configured to generate the ramp voltage.

The ramp voltage generating circuit may include a current source configured to generate a ramping current, a ramping capacitor coupled to the current source and configured to be charged by the ramping current, a transistor switch configured to discharge the ramping capacitor in response to a discharge signal, and a hysteretic comparator configured to compare the ramping voltage with a reference voltage and to generate the discharge signal in response to the comparison of the ramping voltage with the reference voltage.

The current mirror may include a first transistor having a gate terminal and a drain terminal, a second transistor having a gate terminal coupled to the gate terminal of the first transistor and a drain terminal coupled to the drain terminal of the first transistor, and a switch transistor coupled between the drain terminals of the first and second transistors and the gate terminals of the first and second transistors. The switch terminal has a gate terminal coupled to an output of the comparator and is configured to receive the control signal.

The circuit may further include an input current conditioning circuit including a first current mirror and a second current mirror coupled to the first current mirror. The first current mirror may be configured to supply an input current signal as the analog input current signal when the analog input current signal is above a threshold level, and the second current mirror may be configured to supply a reference current signal as the analog input current signal when the analog input current signal is below the threshold level.

The multiplier circuit may be configured to be switched between a first mode in which the input current signal is nonzero and a second mode in which the input current signal is zero.

The circuit may further include a clamping diode coupled to the balance capacitor.

The output current may be given as $I_{PK}=(V_{COMP}*I_{CH})/V_{LIMIT}$, where $I_{PK}$ is the output current, $V_{COMP}$ is the analog input voltage signal, $I_{CH}$ is the analog input current signal, and $V_{LIMIT}$ is a reference voltage.

A charge that is stored in the balance capacitor may be given as $(I_{CH}-I_{PK})DTs$, where D is a duty cycle of the control signal and Ts is a period of the control signal, and wherein a charge that is discharged from the balance capacitor is given as $I_{PK}(1-D)Ts$.

The switched current source may receive a reference current as an input, and the balance capacitor may be charged by the analog input current signal and discharged by the switched current source.

The circuit may further include a hysteretic inverter having an input coupled to the balance capacitor, and a switch coupled to an output of the hysteretic inverter and configured to control the switched current source.

The circuit may further include an output inverter having an input coupled to the output of the hysteretic inverter and configured to generate an output signal having an amplitude that is proportional to the analog input voltage signal.

The circuit may further include a filter configured to filter the output signal of the output inverter, and an amplifier configured to amplify the filtered output signal of the output inverter.

The output current signal may be given by $I_{PK}=I_{CH}*V_{COMP}*K$, wherein $I_{PK}$ (is the output current, $I_{CH}$ is the analog input current signal, $V_{COMP}$ is the analog input voltage signal, and K is a constant.

A charge that is stored in the balance capacitor may be given as $I_{CH}(1-D)T_S$, where D is a duty cycle of the control signal and Ts is a period of the control signal, and wherein a charge that is discharged from the balance capacitor is given as $(I_{FS}-I_{CH})DT_S$, wherein $I_{FS}$ is the reference current.

A power conversion circuit according to some embodiments includes a voltage boost circuit including a boost inductor, the voltage boost circuit being configured to generate an output voltage in response to an input voltage, and a boost controller configured to control operation of the voltage boost circuit.

The boost controller is configured to generate an error signal my multiplying a current signal and a voltage signal, and the power conversion circuit further comprises a multiplier circuit for multiplying the current signal by the voltage signal. The multiplier circuit includes a switched current source that is controlled by a control signal, a control signal generating circuit that is configured to generate the control signal, wherein a duty cycle of the control signal is proportional to a level of the voltage signal, and a balance capacitor coupled to the switched current source. A level of the output current is proportional to a product of a level of the current signal and the level of the voltage signal.

The power conversion circuit may further include an output current mirror coupled to the balance capacitor. The switched current source may receive the analog input current signal as an input, and the balance capacitor may be charged by a current output by the switched current source and is discharged through the output current mirror.

The switched current source may receive a reference current as an input, and the balance capacitor may be charged by the analog input current signal and discharged by the switched current source.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

BRIEF DESCRIPTION OF THE DRAWINGS

The accompanying drawings are included to provide a further understanding of the disclosure and are incorporated in and constitute a part of this application. In the drawings.

DETAILED DESCRIPTION

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
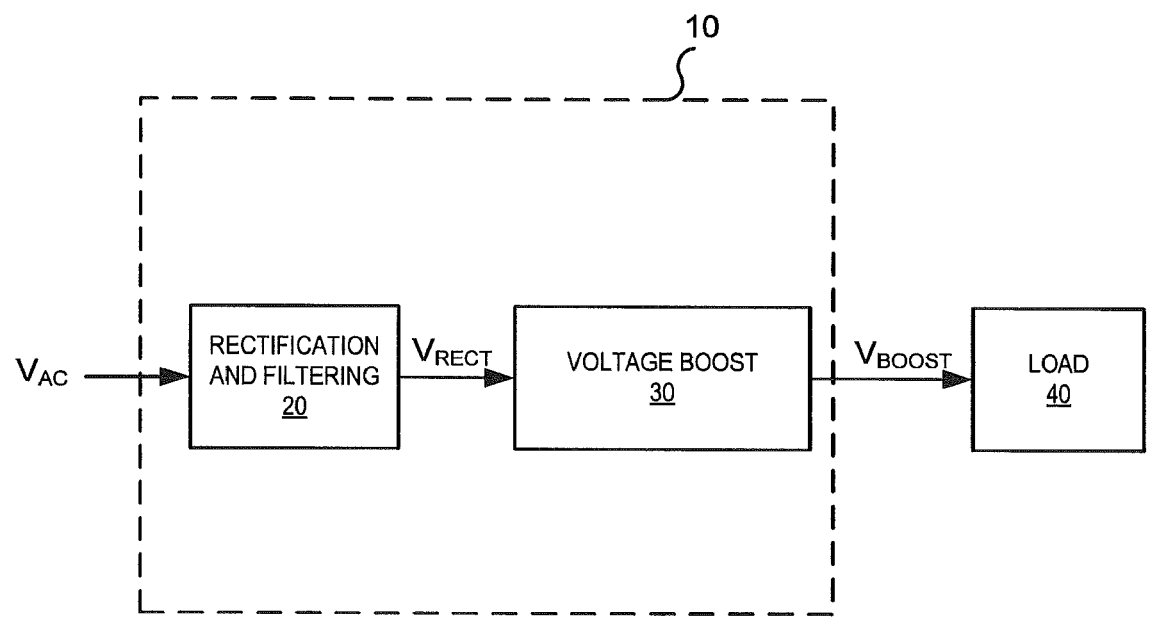
FIG. 1 is a block diagram of a power converter circuit according to some embodiments.

FIG. 1 illustrates a power converter 10 according to some embodiments. The power converter 10 receives an AC input voltage $V_{AC}$ (which may, for example be a 110, 220 or 240 volt AC line voltage) and converts the input voltage to a boosted DC signal $V_{BOOST}$ that is used to drive a load 40. The power converter 10 includes a rectification and filtering circuit 20 that generates a rectified and filtered voltage $V_{RECT}$ in response to the input voltage, and a voltage boost circuit 30 that generates the boosted DC signal $V_{BOOST}$ in response to the rectified and filtered voltage $V_{RECT}$.

Some embodiments provide a voltage boost circuit that regulates a level of current supplied to the load 40. Regulating the load current may be particularly important when driving solid state lighting devices, because the color and/or intensity of light emitted by LEDs may be affected by the level of current flowing through the devices. Variations in drive current may therefore result in undesirable variations in the color and/or intensity of the light output by the apparatus.

Figure 2:
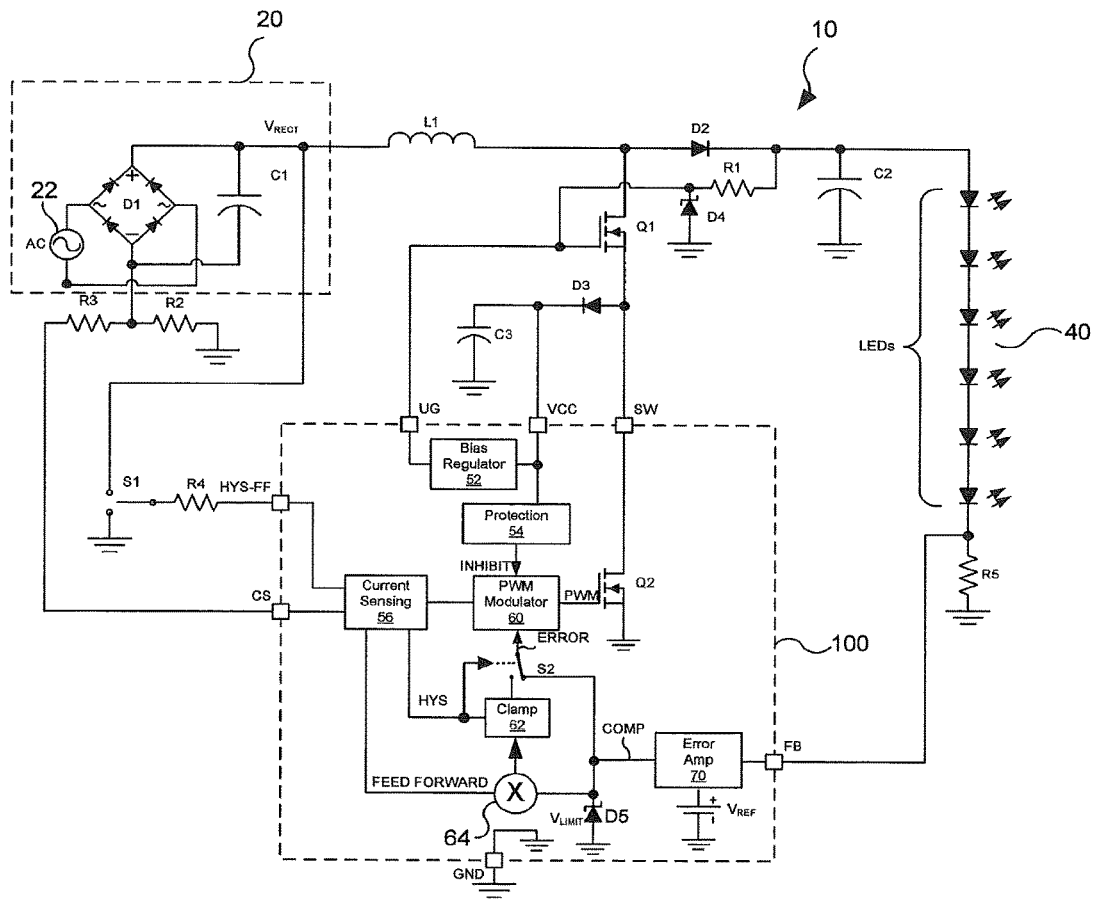
FIG. 2 is a circuit diagram of a power converter circuit according to some embodiments.

FIG. 2 illustrates a power converter 10 including an integrated circuit (IC) controller 100 that regulates load current supplied to the LED load 40. The power converter 10 is powered by a regulated AC input 22 shown as a sine wave voltage generator 22. The input AC signal is rectified by a diode bridge D1 and filtered by a capacitor C1 in the rectification and filtering circuit 20. The output of the rectification and filtering circuit 20 is a rectified sine wave $V_{RECT}$.

The boost converter includes a boost inductor, L1, an output capacitor C2, a diode D2 and a cascade switch including first and second switches Q1 and Q2. A resistor R1 and a Zener diode D4 provide a bias supply for the first switch Q1.

Because the gate of the first switch Q1 is biased by the Zener diode D4, the conductivity of the first and second switches Q1 and Q2 is controlled by a pulse width modulation (PWM) signal applied to the gate of the switch Q2. When the switches Q1 and Q2 are ON, the boost inductor L1 is coupled to ground, causing current through the boost inductor L1 to increase, which stores energy in the boost inductor L1. When the switches are turned off, energy stored in the boost inductor L1 is discharged through the diode D2 to charge the output capacitor C2. By regulating the frequency and/or duration of PWM pulses applied to the gate of the second switch Q2, the voltage level on the output capacitor C2 can be controlled.

A diode D3 and a capacitor C3 work in combination with the cascade switch and a bias regulator 52 to generate a bias signal VCC that may be used, for example, to power the IC controller 100. A suitable bias regulator 52 is described in detail in co-pending and commonly assigned U.S. application Ser. No. 13/664,895 filed concurrently herewith, the disclosure of which is incorporated herein by reference.

The load current is regulated by monitoring the load current and the current in the boost inductor L1. The resistors R2 and R3 are used by the controller 100 to monitor the return inductor current via a current sense pin CS of the controller 100. The resistor R5 is used by the controller 100 to monitor the load current via a feedback pin FB of the controller 100. In particular, an error amplifier 70 generates an error signal that represents the difference between the actual load current and a target load current value. A pulse width modulator 60 generates the signal PWM that controls the conductivity of the cascade switch in response to a level of the error signal.

Embodiments of the present invention are based on the realization that in some cases it may be desirable to regulate the current supplied to the load 40 instead of regulating the voltage applied to the load 40.

As discussed in more detail below, the controller 100 may be configured to operate in either a hysteretic current mode or a critical current mode. In the hysteretic current mode, the inductor current is controlled to operate within a predetermined range based on the level of the error signal. In the critical current mode, the error signal is allowed to fluctuate with the level of the rectified input voltage. The inductor current is thereby controlled to have a peak value that is generally proportional to the level of the rectified input voltage $V_{RECT}$.

As shown in FIG. 2, the controller 100 includes a current sensing circuit 56 that senses a level of the inductor current. The current sensing circuit 56 may also generate a FEED FORWARD signal that represents the level of the rectified input voltage $V_{RECT}$ when the controller is configured for operation in critical current mode, and/or a hysteretic current mode signal HYS when the controller is configured for operation in hysteretic current mode.

A resistor R4 is connected to a selection pin HYS-FF of the controller 100 and to a switch S1. The function of the resistor R4 depends upon on the setting of switch S1. That is, switch S1 may connect the resistor R4 from pin HYS-FF to ground or to the $V_{RECT}$ signal output by the rectification and filtering circuit 20.

Connecting the resistor R4 to ground places the controller in hysteretic current mode and defines a hysteresis window within which the inductor current can fluctuate. In contrast, connecting the resistor R4 from pin HYS-FF to $V_{RECT}$ places the controller 100 in the critical current mode and provides a $V_{RECT}$ feed forward signal to the HYS-FF pin of the controller 100.

When the HYS-FF pin is connected to ground through switch S1, the current sensing circuit 56 generates a HYS signal having a HIGH level, which configures the IC for operation in the hysteretic current mode. When the HYS-FF pin is connected to $V_{RECT}$ through switch S1, the current sensing circuit 56 generates a HYS signal having a LOW level, which configures the IC for operation in the critical current mode.

It will be appreciated that the physical switch S1 is optional. That is, the resistor R4 may be connected to either ground or $V_{RECT}$ by hard wiring the connection.

According to some embodiments, the elements of the controller 100 may be formed on a single integrated circuit chip. The single chip controller 100 may include the second switch Q2 of the cascade switch, the bias regulator 52, the PWM modulator 60, the current sensing circuit 56, a protection circuit 54, a limiter 62, the error amplifier 70, a limiting diode D5, and a multiplier 64.

The PWM modulator 60 compares the inductor current with an ERROR signal (which in the hysteretic mode is the COMP signal output by the error amplifier 70) and responsively generates the PWM signal that drives the second switch Q2.

The protection circuit 54 generates an INHIBIT signal that stops operation of the PWM modulator 60 in response to one or more status indications, such as a low bias power indication, an over temperature indication, etc.

The error amplifier 70 compares the load current sensed at the sense resistor R5 with a reference voltage $V_{REF}$ and outputs a comparison signal COMP that is proportional to the difference between them. The controller 100 attempts to control the inductor current so that the actual output current stays close to a target output current defined by $V_{REF}/R5$.

The level of the COMP signal is limited by the Zener diode D5, which effectively provides current limiting of the current through inductor L1.

In the critical current mode, (when HYS=LOW) the output signal COMP of the error amplifier 70 is multiplied by the FEED FORWARD signal output by the current sensing circuit 56 in a multiplier 64. This causes the peak inductor current to follow $V_{RECT}$. The output of the multiplier 64 is applied to a limiter 62, which may limit both the upper and lower bounds of the ERROR signal. By limiting the range of the ERROR signal, the limiter 62 limits the inductor current.

In the hysteretic current mode (when HYS=HIGH), the control switch S2 causes the COMP signal to bypass the multiplier 64 in response to the HYS signal. This causes the COMP signal to be applied directly to the PWM modulator 60 as the ERROR signal. In the hysteretic current mode, the peak inductor current is therefore proportional to the level of the COMP signal, except as limited by the diode D5.

Figure 3:
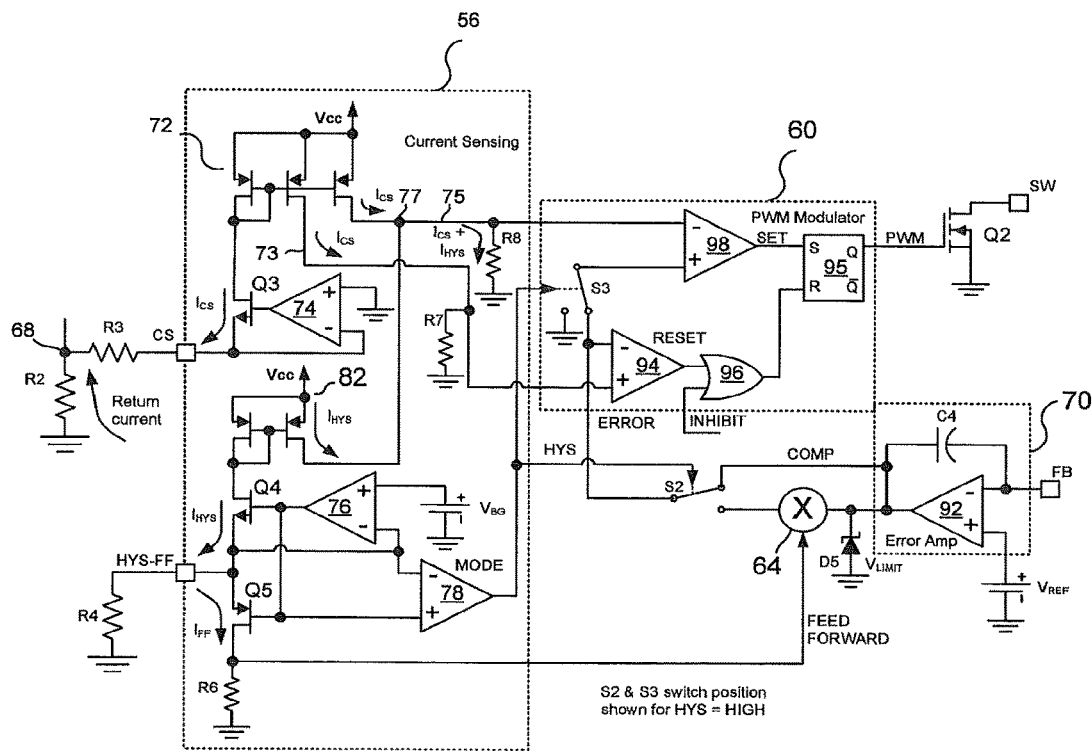
FIG. 3 is a block diagram of a control circuit for a power converter circuit according to some embodiments.

FIG. 3 is a circuit diagram that illustrates a current sensing circuit 56, a PWM modulator 60, and an error amplifier 70 according to some embodiments. In the embodiments illustrated in FIG. 3, the resistor R4 is connected from the HYS-FF pin to ground, which places the controller 100 in the hysteretic current mode. The limiter 62 is omitted for clarity as it is bypassed in the hysteretic mode.

In the embodiments of FIG. 3, the current sensing circuit 56 includes amplifiers 74, 76, an NMOS transistor Q3 at the output of the amplifier 74, an NMOS transistor Q4 at the output of the amplifier 76, and current mirrors 72, 82 coupled to the drains of transistors Q3, Q4, respectively. The inverting input of the amplifier 74 is coupled to the CS pin along with the source of the NMOS transistor Q3. The non-inverting input of the amplifier 74 is coupled to ground.

The inverting input of the amplifier 76 is coupled to the HYS-FF pin along with the source of the NMOS transistor Q4. The non-inverting input of the amplifier 76 is coupled to a reference voltage $V_{BG}$.

A PMOS transistor Q5 has a source coupled to the HYS-FF pin and a drain coupled to a feed forward sense resistor R6. The gate of the PMOS transistor Q5 is coupled to the output of the amplifier 76.

The amplifier 76 attempts to hold the voltage at the gates of the transistors Q4 and Q5 at a voltage that is equal to the sum of $V_{BG}$ and the threshold voltage of the NMOS transistor Q4. Meanwhile, the voltage at the HYS-FF pin is held at $V_{BG}$. This causes the NMOS transistor Q4 to be 'on' and the PMOS transistor Q5 to be 'off,' and causes a current $I_{HYS}$ to flow through the resistor R4 at the HYS-FF pin.

The current mirror 82 outputs a current that is approximately equal to the current $I_{HYS}$ flowing through the HYS-FF pin.

The return inductor current flowing through the resistor R2 causes the voltage at node 68 to be negative. Meanwhile, the amplifier 74 is referenced to ground, which causes the amplifier to hold the gate of the transistor Q3 at a voltage that is greater than zero, which turns on the transistor Q3 and causes a current $I_{CS}$ to flow out the CS pin and through the resistor R3. The current $I_{CS}$ is proportional to the current flowing through the inductor L1.

The current mirror 72 includes a first output line 73 and a second output line 75. A copy of the current $I_{CS}$ flowing through the current sense pin CS is output by the current mirror 72 on the first output line 73 and the second output line 75. The current on the first output line is sensed by a first current sense resistor R7. The output $I_{HYS}$ of the current mirror 82 is combined with the current $I_{CS}$ on the second output line 75 at a combination node 77, and the combined current $I_{CS}+I_{HYS}$ is sensed by a second sense resistor R8. The first sense resistor R7 and the second sense resistor R8 may have the same resistance value R. The feed forward sense resistor R6 may also have the same resistance value R.

The voltage sensed by the first sense resistor R7 is applied to the non-inverting input of a comparator 94, while the voltage sensed by the second sense resistor R8 is applied to the inverting input of a comparator 98. The comparator 94 generates a RESET signal to reset the output of a latch 95 to LOW, while the comparator 98 generates a SET signal to set the output of the latch 95 HIGH. The RESET signal is combined with the INHIBIT signal in an OR-gate 96. Accordingly, the PWM signal may be reset in response to either a RESET signal generated by the comparator 94 or the INHIBIT signal generated by the protection circuit 54 (FIG. 2).

The output of the latch 95 is provided as the PWM signal to the second transistor switch Q2.

The current sensing circuit 56 further includes a MODE comparator 78 that outputs the HYS signal in response to the connection of the HYS-FF pin to ground. That is, when the hysteretic mode is selected, the comparator 76 causes the voltage at the gate of Q4 (which is connected to the noninverting input of the comparator 78) to exceed the voltage at the source of Q4 (which is connected to the inverting input of the comparator 78). In that case, the comparator 74 outputs a HIGH voltage level as the HYS signal.

The error amplifier circuit 70 includes an amplifier 92 having an inverting input coupled to the feedback pin FB, a non-inverting input coupled to a reference voltage $V_{REF}$, and an output coupled to a limiting Zener diode D5. When the HYS signal is HIGH, the multiplier is bypassed by the switch S1, and the COMP signal output by the error amplifier 70 becomes the ERROR signal input to the comparators 94, 98.

The voltage at the HYS-FF pin is held at $V_{BG}$ to forward bias the NMOS transistor Q4. The current flowing in the resistor R4 is therefore $I_{HYS}=V_{BG}/R4$. The PMOS transistor Q5 is biased 'off', which causes the feed forward current $I_{FF}$ to be zero. The MODE comparator 78 monitors the gate-to-source voltage of both FETs Q4 and Q5. Because the NMOS transistor Q4 is 'on' and the PMOS transistor Q5 is 'off', the output HYS of the MODE comparator 78 is HIGH. The voltage controlled switches S2 and S3 are set by the MODE signal in the positions shown in FIG. 3. Namely, the switch S2 connects the COMP output of the error amplifier to the ERROR input of the PWM modulator 60, and the switch S3 connects the non-inverting input of the comparator 98 to the ERROR signal.

In operation, the return inductor current is monitored across resistor R2. The voltage at CS pin is held at ground, such that the current in R3 (and the CS pin) is proportional to the inductor current $$\left(I_{CS} = I_{L1} \cdot \frac{R2}{R3}\right).$$

The current $I_{CS}$ is output by the current mirror 72 on output line 73, and a current $I_{HYS}$ is added to the current $I_{CS}$, and the combined current $I_{HYS}+I_{CS}$ is output on line 75. The current $I_{CS}$ is sensed at sense resistor R7, while the current $I_{HYS}+I_{CS}$ is sensed at sense resistor R8. Accordingly, when the current $I_{CS}+I_{HYS}$ falls to a level such that the voltage sensed at resistor R8 is less than the ERROR signal output by the error amplifier 70, the SET signal output by the comparator 98 transitions to HIGH, causing the PWM signal output by the latch 95 to transition to HIGH.

Likewise, when the current $I_{CS}$ rises to a level such that the voltage sensed at resistor R7 is greater than the ERROR signal output by the error amplifier 70, the RESET signal output by the comparator 94 transitions to HIGH, causing the PWM signal to transition to LOW.

Figure 4:
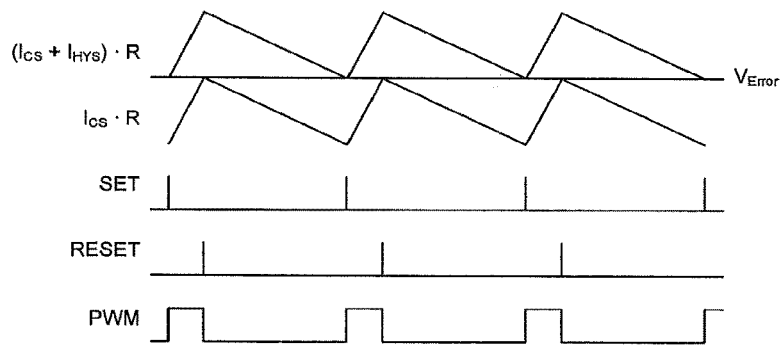
FIG. 4 is a conceptual timing diagram illustrating the timing of various voltage and current signals within a power converter circuit including a control circuit as shown in FIG. 3.

FIG. 4 is a timing diagram showing the periodic steady-state operation of the circuit of FIG. 3. In particular, FIG. 4 shows relative timing of the SET, RESET, PWM signals as well as the current levels of $I_{CS}$ and $I_{CS}+I_{HYS}$. A copy of $I_{CS}$ as scaled by R7 is compared to the ERROR signal to reset the PWM latch 95. That is, the PWM signal goes LOW when $I_{CS}*R7$ exceeds the level of the ERROR signal. A copy of $I_{HYS}$ is added to a copy of $I_{CS}$ and the resulting summation $(I_{CS}+I_{HYS})$ is scaled by R8 for comparison with ERROR to set the PWM latch 95 (PWM goes HIGH).

Figure 5:
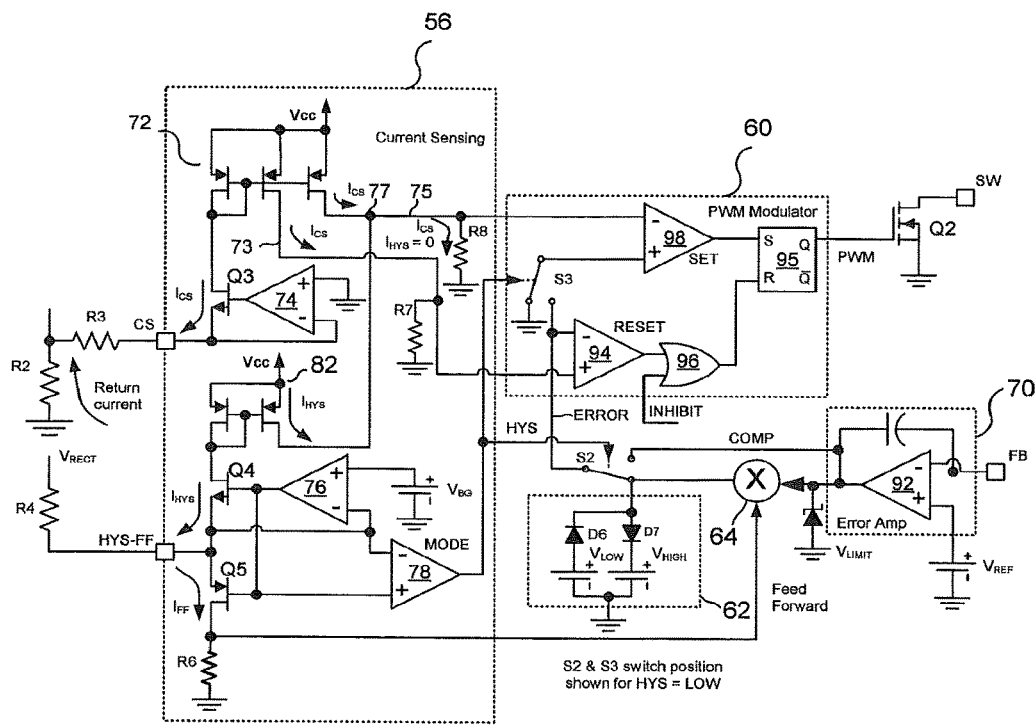
FIG. 5 is a block diagram of a control circuit for a power converter circuit according to further embodiments.

FIG. 5 is a block diagram similar to FIG. 3 showing the current sensing circuit 56, the PWM modulator 60, the limiter 62 and the error amplifier 70 except that in FIG. 5, the resistor R4 is connected from the HYS-FF pin to $V_{RECT}$, which places the circuit into the critical current mode. The limiter 62 is illustrated in FIG. 5, and includes $V_{LOW}$ and $V_{HIGH}$ reference voltages and diodes D6 and D7.

In the critical current mode, the voltage at the HYS-FF pin is held at $V_{BG}$ to forward bias the Q5 PMOS gate, causing a feed forward current $I_{FF}$ to flow in R4. The NMOS transistor Q4 is biased 'off' and $I_{HYS}=0$. The output signal HYS of the MODE comparator is LOW, causing the voltage controlled switches S2 and S3 to be in the positions shown in FIG. 5. Namely, the switch S2 connects the output of the multiplier 64 to the ERROR input of the PWM modulator 60, and the switch S3 connects the non-inverting input of the comparator 98 to GND.

In the critical current mode, when the voltage sensed at R8 (equal to $I_{CS*R}$) drops below zero, the comparator 98 outputs a HIGH voltage, causing the latch 95 to transition to HIGH. When the voltage sensed at R7 (also equal to $I_{CS}*R$) exceeds the ERROR voltage, the comparator 94 outputs a HIGH voltage, causing the latch 95 to transition to LOW. In the critical current mode, the ERROR voltage follows the $V_{RECT}$ voltage with a floor at the $V_{LOW}$ voltage level and a ceiling at the $V_{HIGH}$ voltage level due to the limiter 62.

Figure 6:
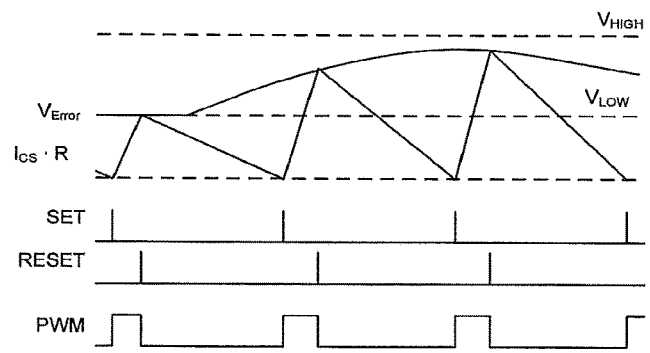
FIG. 6 is a conceptual timing diagram illustrating the timing of various voltage and current signals within a power converter circuit including a control circuit as shown in FIG. 3.

FIG. 6 shows the periodic steady-state operation for the critical current mode. A copy of $I_{CS}$ output on line 73 and scaled by R is compared to ERROR to reset the PWM latch (causing the PWM signal to go LOW). Another copy of $I_{CS}$ output on line 75 is scaled by R (due to $I_{HYS}=0$) and compared to ground to set the PWM latch (PWM goes HIGH). Note that $I_{HYS}$ is zero because of the connection of resistor R4 to $V_{RECT}$. The valley of the inductor ripple current reduces to zero in critical current mode.

In the critical current mode, the FEED FORWARD signal is multiplied by the output of the error amplifier 92 to generate the ERROR signal. Connecting the resistor R4 to $V_{RECT}$ modulates the ERROR signal and causes the peak inductor current to follow a rectified sine wave. The feed forward current $I_{FF}$ is equal to $(V_{RECT}-V_{BG})/R4)$. The amplitude of $V_{RECT}$ is large compare to $V_{BG}$ for most of the cycle and $V_{BG}$ can be neglected. The Feed Forward current $I_{FF}$ and the Feed Forward voltage signal $(=I_{FF}/R)$ approximate a rectified sine wave. The integration time constant of the error amplifier is very low so that the COMP output of the error amplifier 70 can be considered constant. The ERROR signal is the product of the Feed Forward voltage signal and COMP. The current $I_{CS}$, which is proportional to the inductor current, is compared to the ERROR signal to reset the PWM latch, causing the PWM signal to go LOW. The inductor current peak follows the rectified voltage wave shape.

The limiter 62 limits the range of the ERROR signal. The upper bound for ERROR is $V_{HIGH}$, which sets the maximum input current. The lower bound for ERROR in the critical current mode is $V_{LOW}$, which sets the minimum peak inductor current during the zero-crossing of the AC input.

Figure 7:
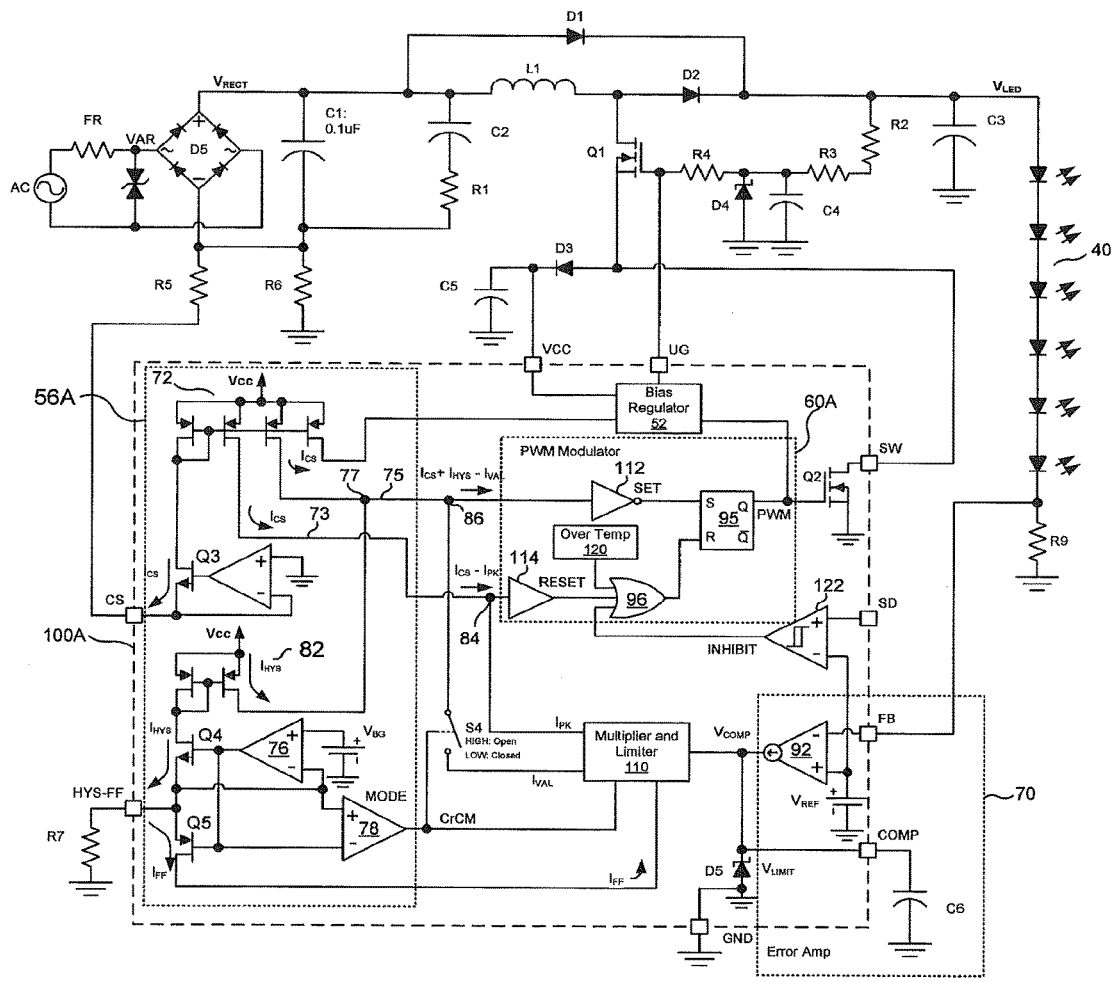
FIG. 7 is a circuit diagram of a power converter circuit according to further embodiments.

A controller 100A according to further embodiments is illustrated in FIG. 7. Like the controller circuit illustrated in FIGS. 2, 3 and 5, the controller 100A causes a voltage boost circuit to supply a controlled amount of current to a load 40. However, the controller 100A shown in FIG. 7 differs from the circuits shown in FIGS. 2, 3 and 5 in that the controller 100A uses current control signals to generate the PWM signal.

In particular, the controller 100A includes a current sensing block 56A that is similar to the current sensing block 56 of FIGS. 2, 3 and 5, except that the current sensing block 56A does not include the sense resistors R7 and R8. Furthermore, the voltage comparators 94 and 98 in the PWM Modulator are eliminated. In the controller 100A, current comparators or simple logic gates are used to provide switching signals. It will be appreciated that a positive current flowing into a logic gate input produces a HIGH voltage at the input of the logic gate, while a negative current at the input of a logic gate results in a LOW voltage at the input of the gate. This aspect of logic gates may be exploited to provide a circuit that uses current signals rather than voltage signals to control a PWM signal.

In the hysteretic mode, the current sensing block 56A generates an output current equal to ICS on line 73 and an output current equal to $I_{CS}+I_{HYS}$ on line 75. The current sensing block 56A also generates a mode signal CrCM as an output of the comparator 78 in the manner described above to generate the HYS signal. In the critical current mode, the current sensing block also generates a feedforward current $I_{FF}$ that is proportional to $V_{RECT}$, as described above.

The use of current control signals can be more accurate in some applications depending upon the specific silicon process used to fabricate the controller. Typical silicon processes used for mixed-signal power control ICs rely on matching devices to meet the accuracy requirements. In the case of the circuit of FIGS. 3 and 5, the PWM modulator is controlled by voltages across sense resistors R7 and R8, which are assumed to have the same resistance. However, the absolute tolerance of these resistors can be over ±30% as a result of temperature and process variations. (Note, however, that similar resistors on a single integrated circuit will track each other such that the relative matching accuracy can achieve ±0.1%.) There are options available including thin film processing and trimming techniques that can improve the absolute tolerance, but these typically add cost. The use of current control signals can provide an approach that meets the required accuracy.

The controller 100A shown in FIG. 7 further includes an error amplifier 70 that functions in a similar manner as described above to produce a voltage signal $V_{COMP}$. A multiplier and limiter circuit 110 generates an output currents $I_{PK}$ and $I_{VAL}$ as a function of $V_{COMP}$, CrCM, and $I_{FF}$. The value of $I_{VAL}$ is subtracted from the sum of $I_{CS}$ and $I_{HYS}$, and the result is applied to the input of an inverter 112. The value of $I_{PK}$ is subtracted from $I_{CS}$, and the result is applied to the input of a buffer 114.

Accordingly, when $I_{CS}+I_{HYS}-I_{VAL}$ falls to zero, the input of the inverter 112 is LOW, which causes the output of the inverter 112 to go HIGH, which sets the PWM latch 95. That is, when $I_{CS}+I_{HYS}$ falls to a value that is equal to $I_{VAL}$ or lower, a negative current is drawn from the input of the inverter 112, causing its output to transition to HIGH.

Similarly, the latch 95 is reset when the output of the buffer 114 transitions to HIGH. When $I_{CS}-I_{PK}$ is positive, (i.e. when $I_{CS}$ exceeds $I_{PK}$), a positive voltage appears at both the input and output of the buffer 114. Because the output of the buffer 114 is provided to the RESET input of the latch 95, this resets the PWM latch 95. $I_{PK}$ and $I_{VAL}$ are therefore similar in function to the ERROR signal described in connection with FIGS. 2-6.

Figure 8A:
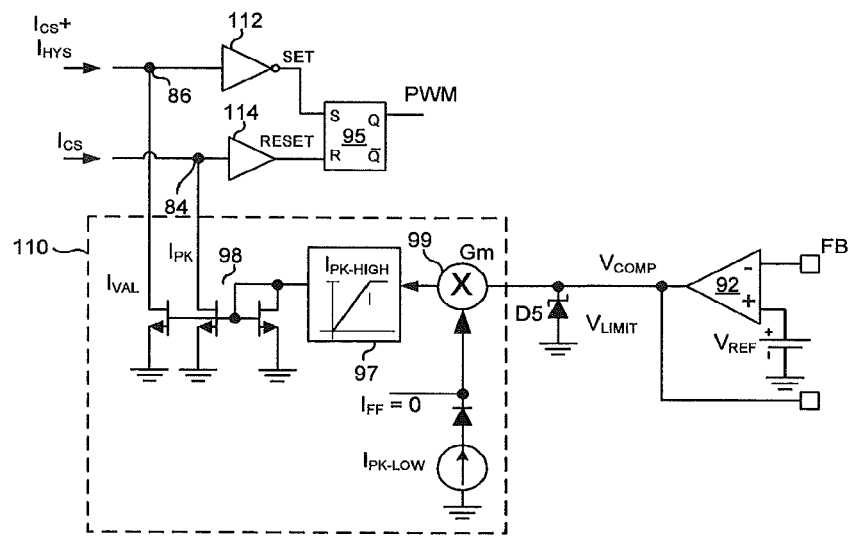
FIG. 8A is a circuit diagram of a multiplier and limiter circuit for a power converter circuit as shown in FIG. 7 and configured to operate in hysteretic mode.
Figure 8B:
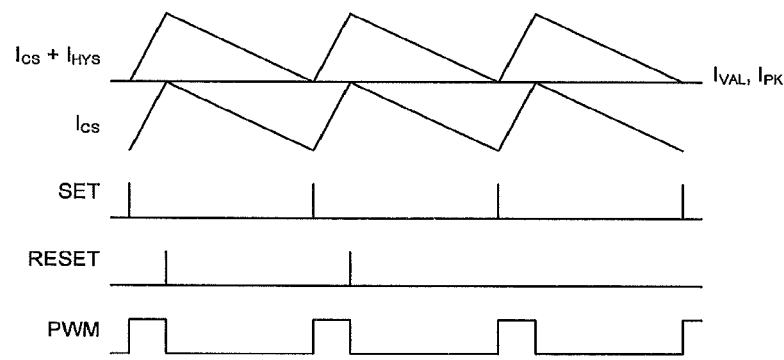
FIG. 8B is a conceptual timing diagram illustrating the timing of various voltage and current signals within a power converter circuit as shown in FIG. 7 and configured to operate in hysteretic mode.

FIG. 8A is a circuit diagram of a multiplier and limiter circuit 110 for a power converter circuit as shown in FIG. 7 and configured to operate in hysteretic mode. FIG. 8B is a conceptual timing diagram illustrating the timing of various voltage and current signals within a power converter circuit as shown in FIG. 7 and configured to operate in hysteretic mode.

As shown in FIG. 8A, the multiplier and limiter circuit 110 includes a multiplier 99 that receives the $V_{COMP}$ signal output by the comparator 92 and the $I_{FF}$ signal. In the hysteretic mode, the $I_{FF}$ signal is zero and $I_{PK\text{-}LOW}$ is constant, so the multiplier simply applies a fixed gain Gm to the $V_{COMP}$ signal. The output is passed to a limiter 97 that generates a current $I_{PK}$ in response to the multiplier signal. The $I_{PK}$ current signal is limited at an upper bound of $I_{PK\text{-}HIGH}$. A current mirror 98 is connected to the limiter 97 and generates two current signals $I_{PK}$ and $I_{VAL}$ that are equal to the current output by the limiter 97. The current signals $I_{PK}$ and $I_{VAL}$ are subtracted at nodes 84 and 86 from the $I_{CS}$ and $I_{CS}+I_{HYS}$ signals, respectively.

Referring to FIG. 8B, when the value of $I_{CS}+I_{HYS}$ drops below the reference value of $I_{VAL}$, the current into the input of the inverter 112 is negative, which produces a LOW voltage at the input of the inverter 112 and a HIGH voltage at the output of the inverter 112. This sets the PWM signal to a HIGH level. When the value of $I_{CS}$ rises above the reference value of $I_{PK}$, the current into the input of the buffer 114 is positive, which produces a HIGH voltage at the input of the buffer 114 and a HIGH voltage at the output of the buffer 114. This resets the PWM signal to a LOW level.

Figure 9A:
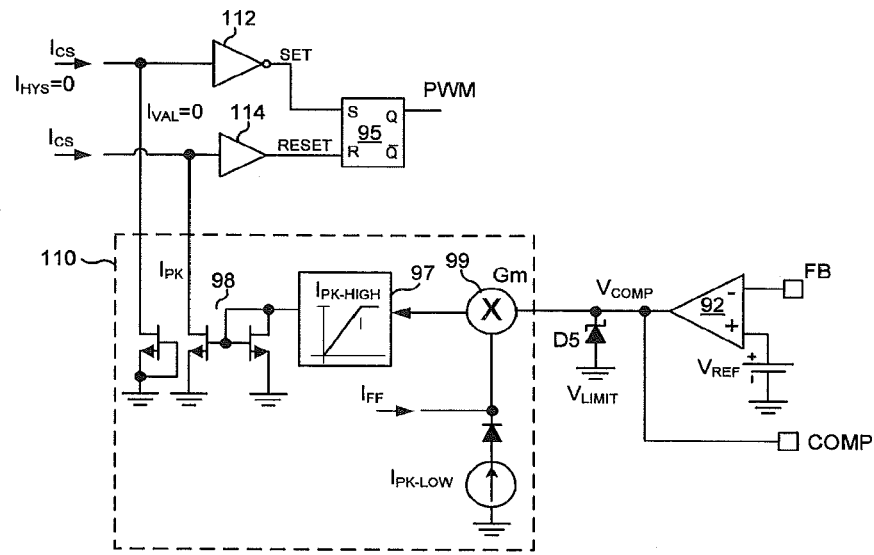
FIG. 9A is a circuit diagram of a multiplier and limiter circuit for a power converter circuit as shown in FIG. 7 and configured to operate in critical current mode.

FIG. 9A is a circuit diagram of a multiplier and limiter circuit for a power converter circuit as shown in FIG. 7 and configured to operate in critical current mode.

In the critical current mode, the current mirror 98 is configured to set the $I_{VAL}$ signal to zero. In addition, the output of the comparator 92 is multiplied by the $I_{FF}$ signal at the multiplier 99.

Figure 9B:
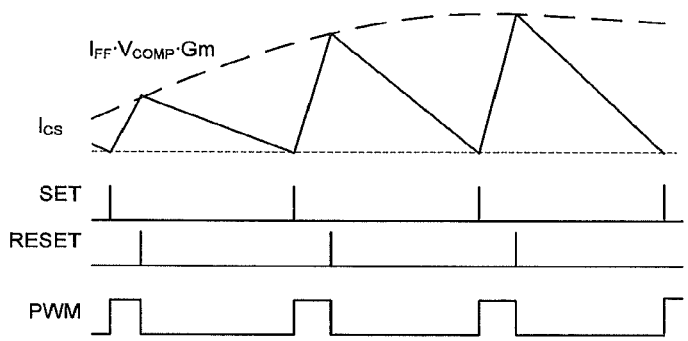
FIG. 9B is a conceptual timing diagram illustrating the timing of various voltage and current signals within a power converter circuit as shown in FIG. 7 and configured to operate in critical current mode.

FIG. 9B is a conceptual timing diagram illustrating the timing of various voltage and current signals within a power converter circuit as shown in FIG. 7 and configured to operate in critical current mode. As shown therein, when the current signal $I_{CS}$ drops below zero a LOW voltage is induced at the input of the inverter 112 and a high voltage is induced at the output of the inverter 112, which sets the PWM signal HIGH. When the current signal $I_{CS}$ rises above the value of $I_{PK}$, a HIGH voltage is induced at the input and output of the buffer 114, which resets the PWM signal LOW.

In the hysteretic current mode, the resistor R7 is connected to ground which results in $I_{FF}=0$ and CrCM=LOW. Both $I_{PK}$ and $I_{VAL}$ are related to $V_{COMP}$ by a fixed gain. The maximum $I_{PK}$ is limited which also limits the boost inductor current.

In the critical current mode, R7 is connected from HYS-FF pin to $V_{RECT}$. The current signal $I_{PK}$ is normally scaled to the product of $V_{COMP}$ and $I_{FF}$ ($I_{VAL}$ is zero with switch S4 open). Both the maximum and minimum of $I_{PK}$ are limited in the critical current mode. The maximum $I_{PK}$ is limited to limit the boost inductor current. A low limit for the minimum $I_{PK}$ sets the minimum peak inductor current during the zero-crossing of the AC input.

An integrated circuit controller as described herein regulates LED current from an AC input power. The integrated circuit modulates a cascade switch in a boost or SEPIC converter powered from a rectified AC input. The integrated circuit can be configured for hysteretic or critical current mode, for example, by connection of a resistor to o ground or to the rectified input voltage. The integrated circuit may include an integrated lower FET (part of the cascade switch), and may provide a low quiescent bias current, return current sensing, and/or low voltage reference and thresholds. Additionally the integrated circuit may reduce the power dissipated with low bias current and/or low voltage references. The integrated circuit may further operate with increased efficiency by employing an enhancement mode MOSFET as a high voltage switch in a cascade switch configuration, and operating the high voltage switch in saturated mode rather than linear mode.

FIGS. 10-16 are flowcharts illustrating operations of circuits/methods according to some embodiments.

Figure 10:
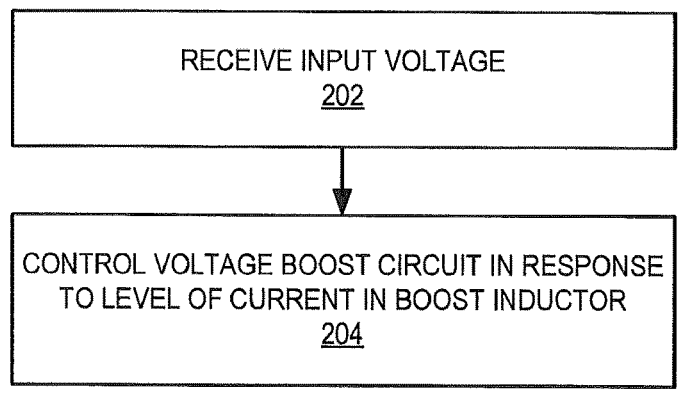
FIGS. 10-16 are flowcharts illustrating operations of circuits/methods according to some embodiments.

In particular, FIG. 10 illustrates a method of operating a voltage conversion circuit including a voltage boost circuit having a boost inductor according to some embodiments. The method includes receiving an input voltage (block 202) and controlling operation of the voltage boost circuit in response to a level of current in the boost inductor (block 204).

Figure 11:
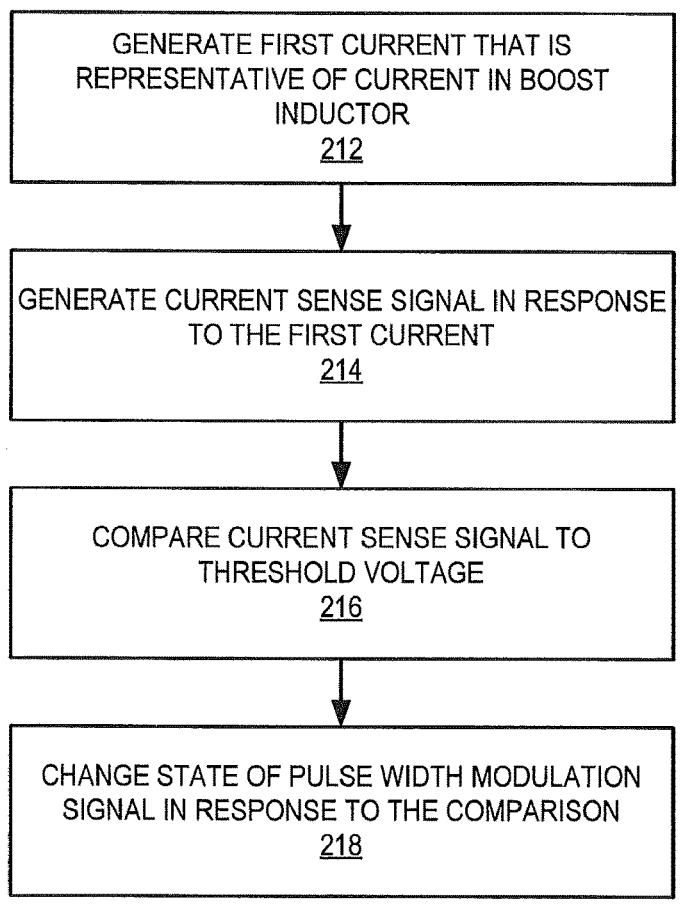

FIG. 11 illustrates operations according to some embodiments. Referring to FIGS. 3, 5 and 11, the methods may include generating a first current ($I_{CS}$) that is representative of the current in the boost inductor (block 212), generating a current sense signal (i.e., the voltage across resistor R7) in response to the first current (block 214), comparing the current sense signal to a threshold voltage defined by the ERROR signal (block 216), and changing a state of the pulse width modulation signal PWM in response to the comparison (block 218).

Figure 12:
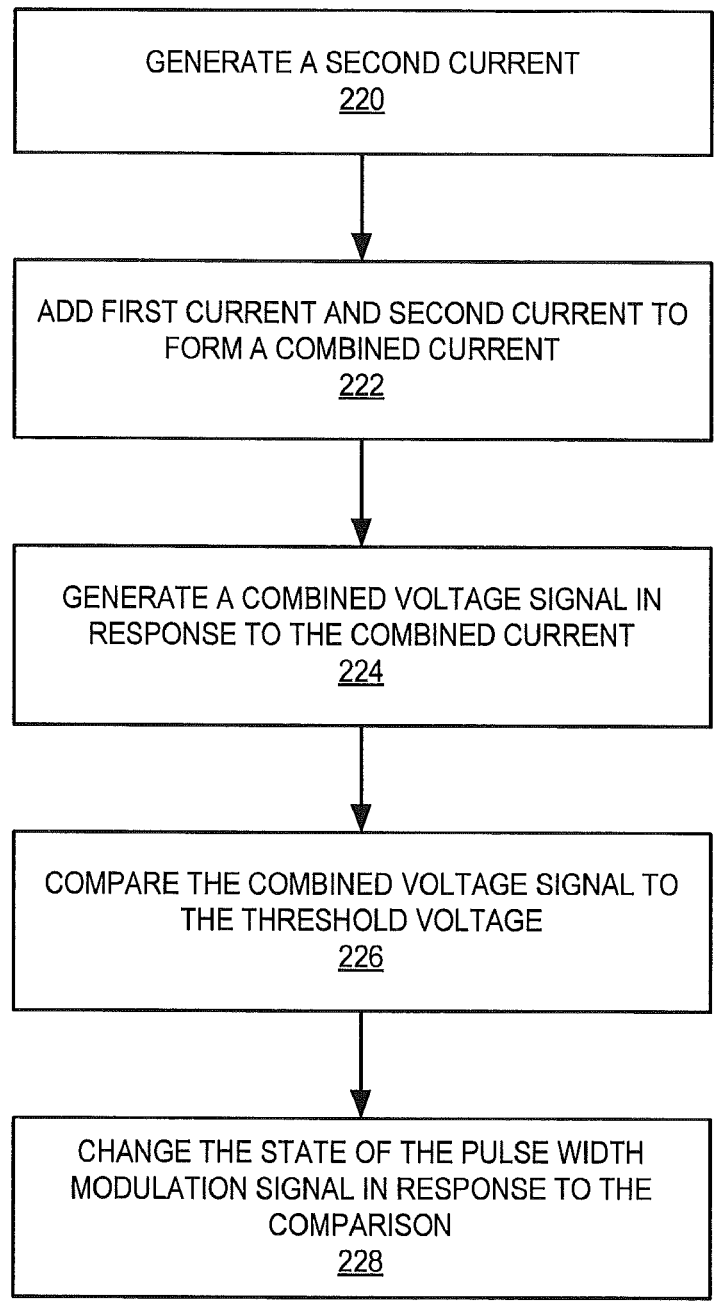

Referring to FIGS. 3 and 12, the methods may include generating a second current ($I_{HYS}$) (block 220), adding the first current ($I_{CS}$) to the second current to generate a combined current ($I_{HYS}+I_{CS}$) (block 222), generating a combined voltage signal in response to the combined current (block 224), comparing the combined voltage signal to the threshold voltage (block 226), and changing a state of the pulse width modulation signal in response to the comparison (block 228).

Figure 13:
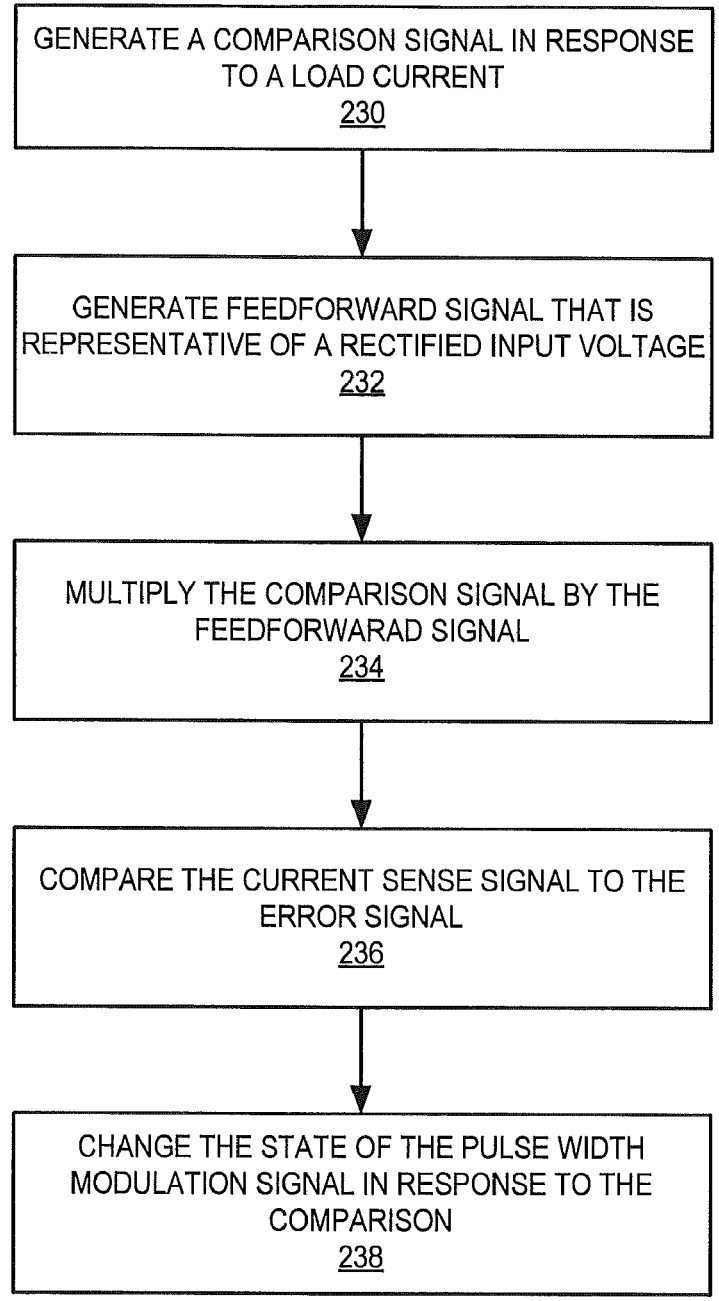

Referring to FIGS. 5 and 13, the methods may include generating a comparison signal COMP in response to a load current (block 230), generating a feedforward voltage signal in response to a feedforward signal ($I_{FF}$) that is representative of a level of a rectified input voltage signal (block 232), multiplying the comparison signal by the feedforward signal to obtain an error signal ERROR (block 234), comparing the current sense signal to the error signal (block 236), and changing a state of the pulse width modulation signal in response to the comparison (block 238).

Figure 14:
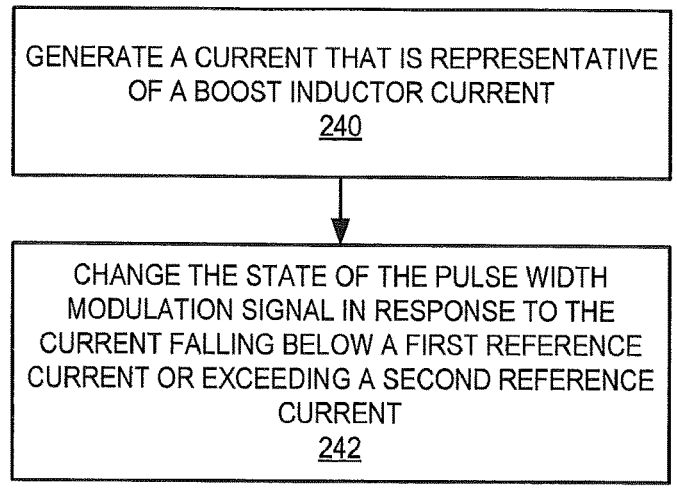

Referring to FIGS. 7 and 14, the methods may include generating a current signal ($I_{CS}$) that is representative of the current in the boost inductor (block 240) and changing a state of the pulse width modulation signal in response to the current signal falling below a first reference current ($I_{VAL}$) or exceeding a second reference current ($I_{PK}$) (block 242).

Figure 15:
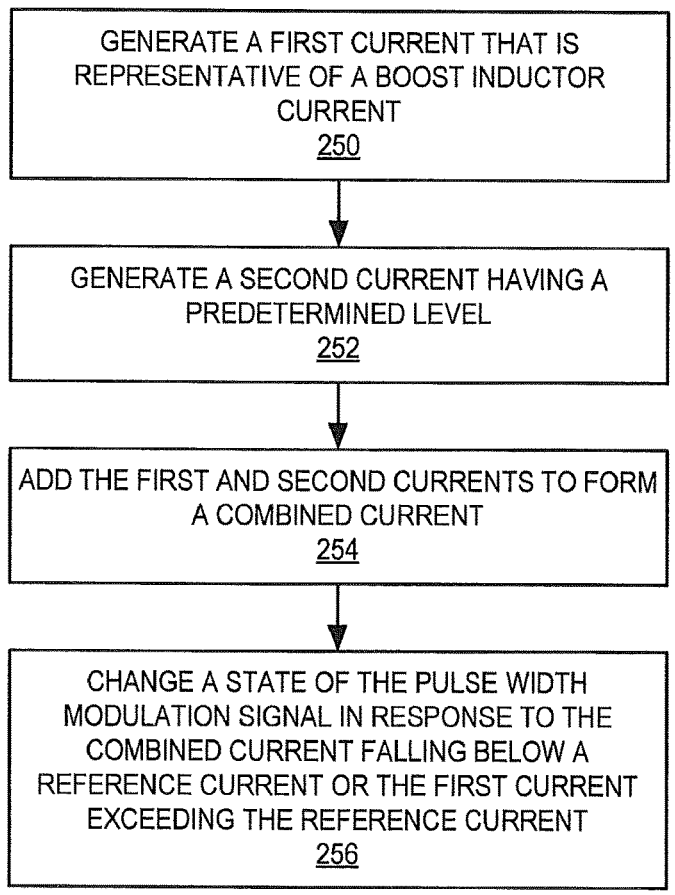

Referring to FIGS. 7, 8A and 15, the methods may include generating a first current ($I_{CS}$) that is representative of the current in the boost inductor (block 250), generating a second current ($I_{HYS}$) having a predetermined level (block 252), adding the first current to the second current to form a combined current (block 254), and changing a state of the pulse width modulation signal in response to the combined current falling below a reference current or in response to the first current exceeding the reference current (block 256).

Figure 16:
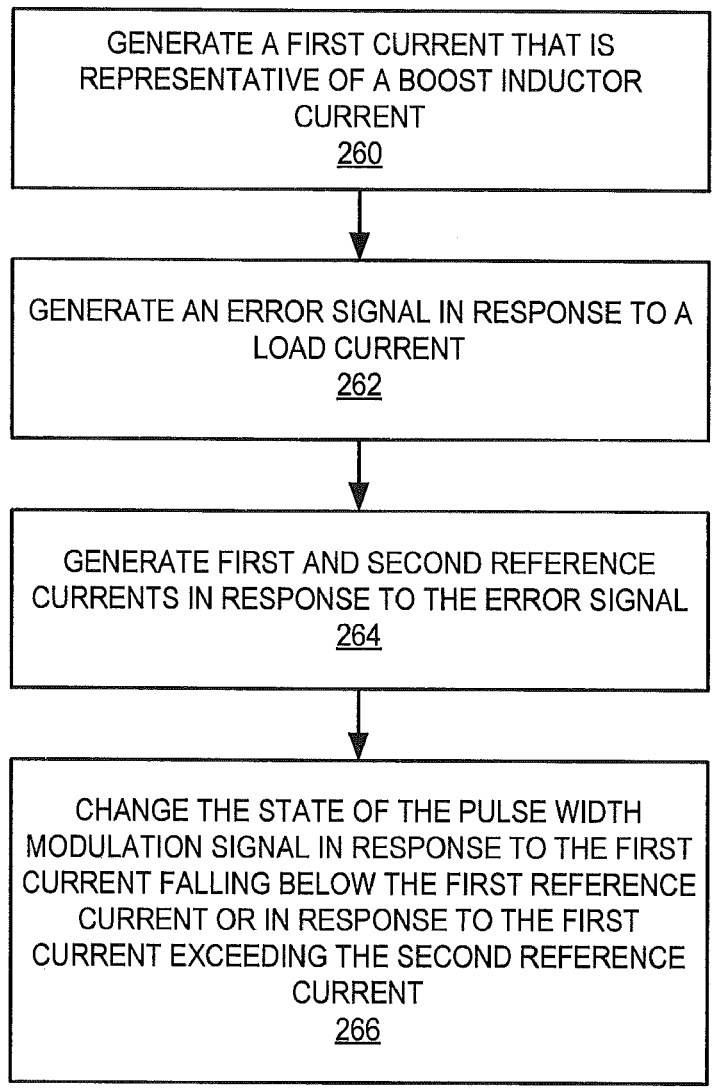

Referring to FIGS. 7, 9A and 16, the methods may include generating a first current ($I_{CS}$) that is representative of the current in the boost inductor (block 260), generating an error signal in response to a load current (block 262), generating first and second reference currents ($I_{VAL}$, $I_{PK}$) in response to the error signal (block 264), and changing a state of the pulse width modulation signal in response to the first current falling below the first reference current or in response to the first current exceeding the second reference current (block 266).

Referring again to FIG. 7, circuits for performing the multiplication of $V_{COMP}$ by $I_{FF}$ to obtain $I_{PK}$ and $I_{VAL}$ are known. For example, analog current signals can be converted to voltage signals using a sense resistor, and the resulting signals can be multiplied by using logarithmic amplifiers using the formula a*b=anti log(log(a)+log(b)). Analog signals can also be multiplied using transconductance amplifiers, such as Gilbert cells. However, each of these approaches may have drawbacks in certain applications, such as power converters. For example, logarithmic amplifiers may present difficulties due to range compression, while transconductance amplifiers may have a very small dynamic range, and may be susceptible to noise. Either of these approaches may be difficult to implement with a sufficient level of accuracy.

Some embodiments provide charge balance multipliers that can be used to multiply an analog current by an analog voltage with a high level of accuracy. These multipliers may be used to multiply $V_{COMP}$ by $I_{FF}$ to obtain $I_{PK}$ and $I_{VAL}$ in power converters according to some embodiments. For example some embodiments may have an accuracy defined by the accuracy of a reference voltage, which can be very tightly controlled. Other embodiments may have an accuracy defined by the ratio of resistance of resistors, which can also be tightly controlled.

Figure 17:
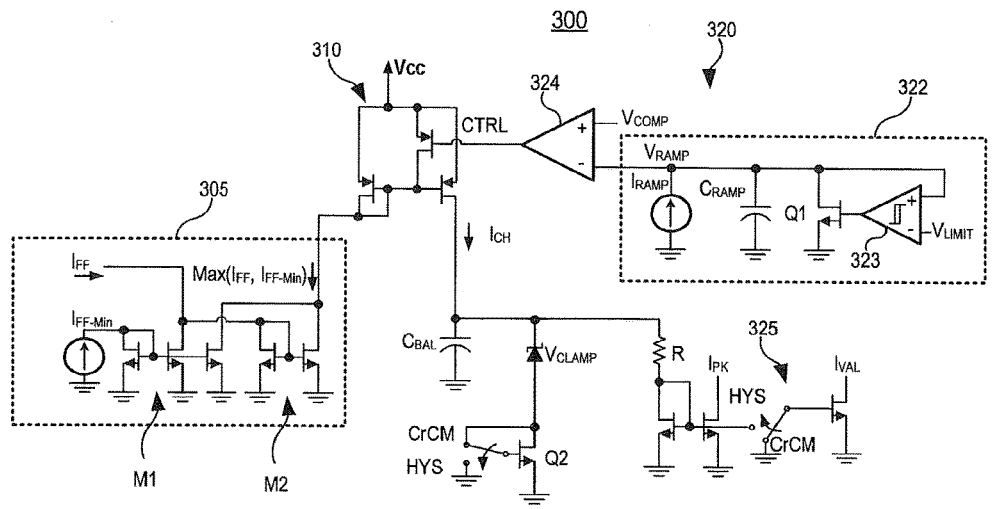
FIG. 17 is a schematic diagram of a charge balance multiplier in accordance with some embodiments.

FIG. 17 illustrates a charge balance multiplier circuit 300 that may be used to implement the multiplier and limiter circuit 110 shown in FIG. 7. Referring to FIG. 17, the charge balance amplifier circuit 300 includes a feedforward conditioning circuit 305, a switched current source 310, a balance capacitor $C_{BAL}$, a clamping diode $V_{CLAMP}$, a control signal generating circuit 320 and an output current mirror 325 including an output resistor R. The control signal generating circuit 320 includes a ramping voltage generator 322 and a comparator 324. The control signal generating circuit 320 generates a control signal CTRL that controls operation of the switched current source 310. The switched current source 310 may be implemented as a switched current mirror as shown in FIG. 17. However, it will be appreciated that other types of circuits may be used to provide the switched current source.

The feedforward conditioning circuit 305 includes a first current mirror M1 and a second current mirror M2. The first current mirror M1 receives a constant current signal $I_{FF-Min}$ as an input. The feedforward current $I_{FF}$ is input to the second current mirror M2. Outputs of both the first and second current mirrors M1, M2 are coupled to the input of the switched current source 310. The first current mirror M1 ensures that a minimum level of feedforward current is drawn through the switched current source 310. Accordingly, the input to the switched current source 310 can be expressed as max($I_{FF}$, $I_{FF-Min}$).

The output of the switched current source 310 is controlled by a control signal CRTL output by the control signal generating circuit 320, and in particular generated by the comparator 324. When the control signal CTRL signal is HIGH, the switched current source 310 outputs a current equal to the input current, which is equal to max($I_{FF}$, $I_{FF-Min}$). When the control signal CTRL is LOW, the switched current source 310 is off. The average charging current that is input to the balance capacitor $C_{BAL}$ may therefore be expressed as $D*I_{CH}$, where $I_{CH}$=max($I_{FF}$, $I_{FF-Min}$) and D is the duty cycle of the control signal CTRL.

The amount of charge that is input to the balance capacitor $C_{BAL}$ is therefore proportional to the duty cycle of the control signal CTRL output by the control signal generating circuit 320. The duty cycle of the control signal CTRL generated by the control signal generating circuit 320 is controlled by the charging and discharging cycle of a ramping capacitor $C_{ramp}$ in the control signal generating circuit 320 and by the level of the input voltage $V_{COMP}$.

The voltage at the output of the balance capacitor $C_{BAL}$ is clamped by the clamping diode $V_{CLAMP}$, which limits the upper level of the $I_{PK}$ current to $I_{PK-HIGH}$. In the critical current mode, an extra threshold voltage $V_{TH}$ is added by the transistor Q2, which is switched in response to the CrCM signal.

Figure 18A:
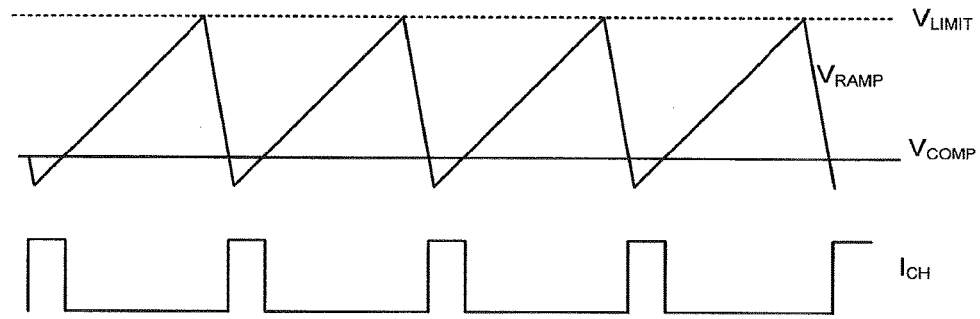
FIGS. 18A and 18B are graphs that illustrate operation of the charge balance multiplier of FIG. 17.
Figure 18B:
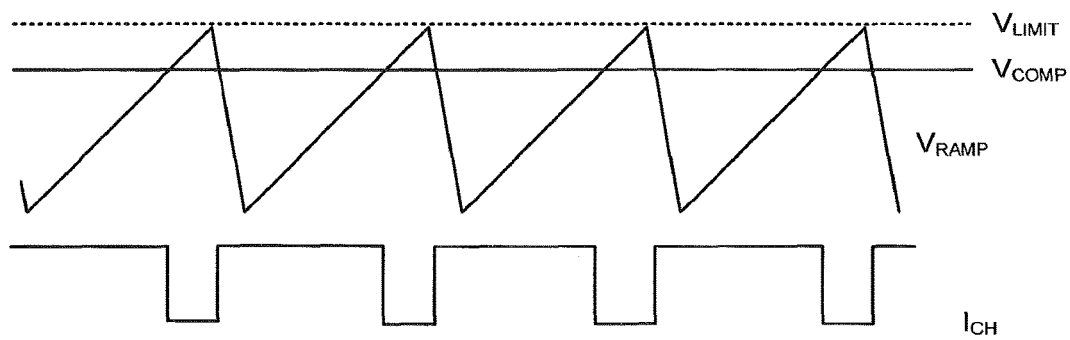

FIGS. 18A and 18B are diagrams that illustrate hypothetical curves for $V_{RAMP}$, $V_{COMP}$ and the current $I_{CH}$ output by the switched current source 310.

Referring to FIGS. 17 and 18A, a constant current source $I_{RAMP}$ charges the ramping capacitor $C_{RAMP}$, causing the voltage level on the ramping capacitor $C_{RAMP}$ to rise in a linear fashion. When the voltage $V_{RAMP}$ on the ramping capacitor exceeds $V_{COMP}$, the output of the comparator 324 goes HIGH. When the voltage $V_{RAMP}$ exceeds the value of $V_{LIMIT}$, the output of the hysteretic comparator 323 transitions to HIGH, causing the transistor Q1 to turn on, which discharges the ramping capacitor $C_{RAMP}$. The hysteretic comparator 323 has a built-in hysteresis to allow the ramping capacitor $C_{RAMP}$ to discharge to a suitably low level before being charged again.

The charge on the balance capacitor $C_{BAL}$ is discharged through the output current mirror 325. Note that in the critical current mode, the $I_{VAL}$ output is not used; accordingly it is switched out of the current mirror 325 when the CrCM signal is HIGH. Because the charge that is stored into the balance capacitor $C_{BAL}$ must equal the charge that is drawn from the capacitor, a charge balance equation may be written as follows:

$$(I_{CH}-I_{PK})DT_S=I_{PK}(1-D)T_S \quad (1)$$

where Ts is the switching period.

From equation (1), it is apparent that the duty cycle D can be expressed as a function of $I_{PK}$ and $I_{CH}$ as follows:

$$D=I_{PK}/I_{CH} \quad (2)$$

However, the duty cycle can also be expressed as a function of the voltages $V_{COMP}$ and $V_{LIMIT}$ as follows:

$$D=V_{COMP}/V_{LIMIT} \quad (3)$$

Combining equations (2) and (3) yields an expression for $I_{PK}$ in terms of $I_{FF}$ and $V_{COMP}$ as follows:

$$I_{PK}=(V_{COMP}*I_{CH})/V_{LIMIT} \quad (4)$$

Because the charging current $I_{CH}$ is simply the feedforward current $I_{FF}$ with a floor of $I_{FF\text{-}Min}$, $I_{PK}$ is proportional to the product of the feedforward current $I_{FF}$ and the voltage $V_{COMP}$.

Figure 19:
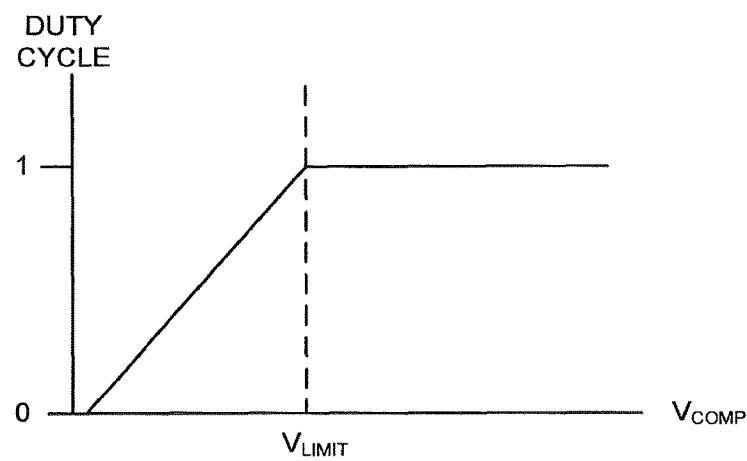
FIG. 19 is a graph illustrating the relationship of the duty cycle of the charging current and the ramping voltage of the circuit of FIG. 17.

Referring to FIG. 18B, as the voltage $V_{COMP}$ increases, the duty cycle D of the charging current $I_{CH}$ increases. When $V_{COMP}$ reaches $V_{LIMIT}$, the duty cycle D becomes unity, placing an upper limit on the amount of charge that can be stored into the balance capacitor $C_{BAL}$, and effectively placing an upper limit on $I_{PK}$. This is illustrated graphically in FIG. 19, which shows that the duty cycle D increases linearly as $V_{COMP}$ increases up to the value of $V_{LIMIT}$. Accordingly, in some embodiments, the clamping diode D5 shown in FIG. 7 may not be needed.

In the hysteretic mode, the feedforward current $I_{FF}$ is zero, so the minimum feedforward current $I_{FF\text{-}Min}$ is drawn through the PWM controlled current mirror 310. Moreover, $I_{VAL}$ is also generated by the output current mirror 325 in the hysteretic mode, and is equal to the $I_{PK}$ current.

Figure 20:
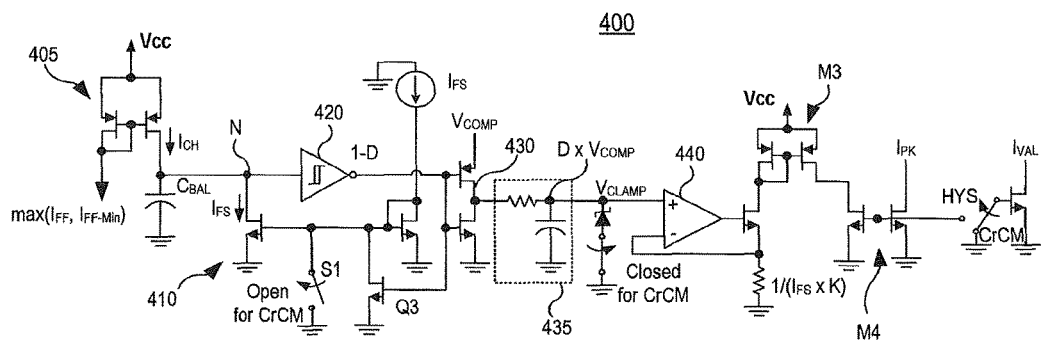
FIG. 20 is a schematic diagram of a charge balance multiplier in accordance with further embodiments.

A charge balance multiplier circuit 400 according to further embodiments is illustrated in FIG. 20. The charge balance multiplier circuit 400 includes a current mirror 405 that generates a charging signal $I_{CH}$ that charges a balance capacitor $C_{BAL}$ at node N. The charging signal $I_{CH}$ is equal to max($I_{FF}$, $I_{FF\text{-}Min}$), which may be generated, for example, using a feedforward conditioning circuit 305 as illustrated in FIG. 17. The balance capacitor $C_{BAL}$ is discharged by a full scale current reference $I_{FS}$ through a switched current source 410.

The balance capacitor $C_{BAL}$ is coupled at node N to an input of a hysteretic inverter 420. The signal input to the hysteretic inverter 420 is equal to the voltage on the balance capacitor $C_{BAL}$, which is determined by a full scale current reference $I_{FS}$ and the charging current $I_{CH}$.

The balance capacitor $C_{BAL}$ is charged by the charging current $I_{CH}$ when the voltage on the balance capacitor $C_{BAL}$ is lower than the level needed to force the output of the hysteretic inverter 420 low. In that case, the output of the hysteretic inverter 420 is high, which turns on the transistor switch Q3 and turns off the switched current source 410. When the switched current source 410 is turned off, the full scale reference current $I_{FS}$ is not drawn from node N by the switched current source 410.

When the charging current $I_{CH}$ charges the balance capacitor to a voltage level that is sufficient to force the output of the hysteretic inverter 420 low, the transistor switch Q3 turns off, which activates the switched current source 410 and causes a current equal to the full scale reference current $I_{FS}$ to be drawn from node N. This results in a discharge of current from the balance capacitor $C_{BAL}$. Because the charging current $I_{CH}$ continues to flow, the discharge current from the balance capacitor $C_{BAL}$ is given as $I_{FS}-I_{CH}$.

The output of the hysteretic inverter 420 is provided as an input to a CMOS inverter 430. Thus, the signal input to the CMOS inverter 430 has a duty cycle of 1−D.

As described above, the discharge current from the balance capacitor $C_{BAL}$ is switched by the transistor switch Q3 at the 1−D duty cycle in response to the output of the hysteretic inverter 420. Since the charge flowing into the balance capacitor $C_{BAL}$ when it is being charged is equal to the charge flowing out of the balance capacitor $C_{BAL}$ when it is being discharged, a charge balance equation may be written as follows:

$$(I_{FS}-I_{CH})DT_S=I_{CH}(1-D)T_S \quad (5)$$

From equation (5), it is possible to express the duty cycle D in terms of $I_{CH}$ and $I_{FS}$ as follows:

$$D=I_{CH}/I_{FS} \quad (6)$$

The CMOS inverter 430 generates an output voltage that alternates between ground and $V_{COMP}$. The CMOS inverter 430 therefore generates a pulse train that has a duty cycle of D that is proportional to $I_{CH}$ and that has an amplitude between ground and $V_{COMP}$.

The signal output by the CMOS inverter 430 is filtered by an RC filter 435, which averages the pulse train to form a voltage having a level of ($I_{CH}*V_{COMP}/I_{FS}$). The signal is then amplified by an amplifier 440 having a gain K to generate the current $I_{PK}$ through current mirrors M3, M4. The voltage signal is clamped at a level of $V_{CLAMP}$, which places an upper limit $I_{PK\text{-}HIGH}$ on $I_{PK}$. That is:

$$V_{CLAMP}=I_{PK\text{-}HIGH}*R \quad (7)$$

where $$R=1/(I_{FS}*K) \quad (8)$$

The gain K of the amplifier 440 is set so that $I_{PK}=I_{CH}*V_{COMP}*K$.

In hysteretic mode, $I_{FF}$ is equal to zero, so the switch S1 remains closed to shut off the current reference $I_{FS}$. The $I_{FF\text{-}MIN}$ reference signal saturates the hysteretic comparator 420 HIGH, and the output of the CMOS inverter 430 stays at $V_{COMP}$. $I_{PK}$ and $I_{VAL}$ are therefore set at $V_{COMP}/R$.

The circuits/methods described herein for performing the multiplying/limiting function of the multiplier and limiter 110 of FIG. 7 may provide highly linear first quadrant analog multiplication of a current signal and a voltage signal. These circuits/methods may provide a very accurate solution for the multiplying/limiting function, which may be important for the operation of a power conversion circuit as described herein.

Although the circuits illustrated in FIG. 17 and are shown as being implemented with MOSFET transistor switches, it will be appreciated that other types of transistor switches, such bipolar junction transistor (BJT) switches could be used in some embodiments.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A power conversion circuit, comprising:
a voltage boost circuit including a boost inductor, the voltage boost circuit being configured to generate an output voltage in response to an input voltage; and
a boost controller configured to control operation of the voltage boost circuit;
wherein the boost controller is configured to generate an error signal by multiplying a current signal and a voltage signal; and
wherein the power conversion circuit further comprises a multiplier circuit for multiplying the current signal by the voltage signal, the multiplier circuit comprising:
a switched current source that is controlled by a control signal;
a control signal generating circuit that is configured to generate the control signal, wherein a duty cycle of the control signal is proportional to a level of the voltage signal; and
a balance capacitor coupled to the switched current source;
wherein a level of output current output by the multiplier circuit is proportional to a product of a level of the current signal and the level of the voltage signal;
the power conversion circuit further comprising:
an output current mirror coupled to the balance capacitor;
wherein the switched current source receives the current signal as an input; and
wherein the balance capacitor is charged by the switched current source with the duty cycle corresponding to the control signal and is discharged through the output current mirror.

2. The power conversion circuit of claim 1, wherein the output current is given as:

$$I_{PK}=(V_{COMP}*I_{CH})/V_{LIMIT}$$

where $I_{PK}$ is the output current, $V_{COMP}$ is an analog input voltage signal, $I_{CH}$ is a switched current with the duty cycle corresponding to the control signal and formed from a varying analog input current signal, and $V_{LIMIT}$ is a reference voltage.

3. The power conversion circuit of claim 2, wherein a first charge that is stored in the balance capacitor is given as $(I_{CH}-I_{PK})DTs$, where D is the duty cycle of the control signal and Ts is a period of the control signal, and wherein a charge that is discharged from the balance capacitor is given as $I_{PK}(1-D)Ts$.

4. The power conversion circuit of claim 3, further comprising:
a hysteretic inverter having an input coupled to the balance capacitor; and
a switch coupled to an output of the hysteretic inverter and configured to control the switched current source.

5. The power conversion circuit of claim 4, further comprising:
an output inverter having an input coupled to the output of the hysteretic inverter and configured to generate an output signal having an amplitude that is proportional to the voltage signal.

6. The power conversion circuit of claim 5, further comprising:
a filter configured to filter the output signal of the output inverter; and
an amplifier configured to amplify a filtered output signal of the filter.

7. The power conversion circuit of claim 1, wherein the output current is given by:

$$I_{PK}=I_{CH}*V_{COMP}*K$$

wherein $I_{PK}$ is the output current, $I_{CH}$ is a switched current with the duty cycle corresponding to the control signal and formed from a varying analog input current signal, $V_{COMP}$ is an analog input voltage signal, and K is a constant.

8. A power conversion circuit, comprising:
a voltage boost circuit including a boost inductor, the voltage boost circuit being configured to generate an output voltage in response to an input voltage; and
a boost controller configured to control operation of the voltage boost circuit;
wherein the boost controller is configured to generate an error signal by multiplying a current signal and a voltage signal; and
wherein the power conversion circuit further comprises a multiplier circuit for multiplying the current signal by the voltage signal, the multiplier circuit comprising:
a switched current source that is controlled by a control signal;
a control signal generating circuit that is configured to generate the control signal, wherein a duty cycle of the control signal is proportional to a level of the voltage signal; and
a balance capacitor coupled to the switched current source;
wherein a level of output current output by the multiplier circuit is proportional to a product of a level of the current signal and the level of the voltage signal;
wherein the power conversion circuit further comprises:
an output current mirror coupled to the balance capacitor;
wherein the switched current source receives an analog input current signal as an input; and
wherein the balance capacitor is charged by a current output by the switched current source and is discharged through the output current mirror.

9. A power conversion circuit, comprising:
a voltage boost circuit including a boost inductor, the voltage boost circuit being configured to generate an output voltage in response to an input voltage; and
a boost controller configured to control operation of the voltage boost circuit;
wherein the boost controller is configured to generate an error signal by multiplying a current signal and a voltage signal; and
wherein the power conversion circuit further comprises a multiplier circuit for multiplying the current signal by the voltage signal, the multiplier circuit comprising:
a switched current source that is controlled by a control signal;
a control signal generating circuit that is configured to generate the control signal, wherein a duty cycle of the control signal is proportional to a level of the voltage signal; and
a balance capacitor coupled to the switched current source;
wherein a level of output current output by the multiplier circuit is proportional to a product of a level of the current signal and the level of the voltage signal;
wherein the switched current source receives a reference current as an input, and wherein the balance capacitor is charged by an analog input current signal and is discharged by the switched current source.

* * * * *